US012442289B2

(12) United States Patent
Saini et al.

(10) Patent No.: US 12,442,289 B2
(45) Date of Patent: Oct. 14, 2025

(54) OIL, GAS AND WATER WELL TRACERS WITH TUNABLE RELEASE PROFILE

(71) Applicant: SAUDI ARABIAN OIL COMPANY, Dhahran (SA)

(72) Inventors: Rajesh Kumar Saini, Cypress, TX (US); Amy J. Cairns, Houston, TX (US); Shitong Sherry Zhu, Waban, MA (US); Ayrat Gizzatov, Winchester, MA (US); Wei Wang, Fremont, CA (US); Mohammed Sayed, Katy, TX (US); Hooisweng Ow, Woburn, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/680,320

(22) Filed: May 31, 2024

(65) Prior Publication Data

US 2024/0318545 A1    Sep. 26, 2024

Related U.S. Application Data

(62) Division of application No. 17/815,393, filed on Jul. 27, 2022, now Pat. No. 12,037,893.

(51) Int. Cl.
   *E21B 47/11* (2012.01)
   *E21B 43/26* (2006.01)
(52) U.S. Cl.
   CPC .............. *E21B 47/11* (2020.05); *E21B 43/26* (2013.01)

(58) Field of Classification Search
   CPC .......... E21B 47/11; E21B 49/00; E21B 47/00; E21B 43/25; E21B 43/26
   See application file for complete search history.

(56) References Cited

U.S. PATENT DOCUMENTS

2018/0298274 A1*   10/2018   Zhao .................... C09K 8/588

FOREIGN PATENT DOCUMENTS

EP           3149103 B1 *   5/2018   ............. C09K 8/035

* cited by examiner

*Primary Examiner* — Zakiya W Bates
(74) *Attorney, Agent, or Firm* — Osha Bergman Watanabe & Burton LLP

(57) ABSTRACT

A method includes introducing a fluoro-based small molecule tracer into a stimulation fluid, injecting the stimulation fluid into a target zone of a subterranean formation, and maintaining the fluoro-based small molecule tracer inside the target zone of the subterranean formation for an amount of time. While being maintained inside the target zone, the fluoro-based small molecule tracer comes into contact with water at a downhole temperature resulting in hydrolysis of the fluoro-based small molecule tracer to produce a fluorinated tracer and a nonfluorinated group. Then, produced fluid that includes the fluorinated tracer is recovered, a concentration of the fluorinated tracer in the hydrocarbons is determined, and the concentration of the fluorinated tracer is correlated to a productivity of the target zone of the subterranean formation.

11 Claims, 5 Drawing Sheets

OIL, GAS AND WATER WELL TRACERS WITH TUNABLE RELEASE PROFILE

CROSS-REFERENCE TO RELATED APPLICATIONS

This Application is a divisional application of U.S. application Ser. No. 17/815,393 filed on Jul. 27, 2022. The entire content of this application is incorporated herein by reference in its entirety.

BACKGROUND

In the oil and gas industry, tracers are used for monitoring, mapping, and confirming the presence of hydrocarbons in place as well as the production of hydrocarbons from various zones of interest in a reservoir. For example, tracers are used for applications such as waterflood optimization, oil saturation determination, fluid pathway identification, and inter-well connectivity determination. Nonetheless, monitoring and confirming production from different zones in oil and gas wells using current tracer technology remains a challenge. In particular, monitoring production from various zones and stages after acid or fracturing stimulation is especially difficult. Currently, production logging tools can be used to determine production from different zones of a reservoir, however these tools are expensive and require production to be halted during use.

Various chemical tracers may be used for production monitoring. For example, tritiated and deuterated hydrocarbons are commonly used to monitor gas wells, whereas perfluorocarbons are generally used to monitor oil wells. These tracers have several drawbacks including high cost and environmental toxicity. Additionally, current chemical tracer technology does not provide for the controlled release of such tracers or the ability of the tracers to reside in the formation for prolonged periods of time. As such, the development of cost-effective, environmentally friendly chemical tracers that may undergo controlled release after residing downhole for a given period of time for oil and gas wells is an important goal in the oil and gas industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method including introducing a fluoro-based small molecule tracer into a stimulation fluid and injecting the stimulation fluid into a target zone of a subterranean formation. The fluoro-based small molecule tracer may be maintained inside the target zone of the subterranean formation for an amount of time, during which the fluoro-based small molecule tracer comes into contact with water at a downhole temperature resulting in hydrolysis of the fluoro-based small molecule tracer to produce a fluorinated tracer and a nonfluorinated group. Then, the method includes recovering produced fluid from the subterranean formation, wherein the produced fluid includes the fluorinated tracer, determining a concentration of the fluorinated tracer in the hydrocarbons, and correlating the concentration of the fluorinated tracer to a productivity of the target zone of the subterranean formation.

In another aspect, embodiments disclosed herein relate to a method that includes injecting a fluoro-based small molecule tracer and a nonreactive tracer into a first well in a subterranean formation. Then, the fluoro-based small molecule tracer and the nonreactive tracer are maintained in the subterranean formation for an amount of time, during which the fluoro-based small molecule tracer comes into contact with water at a downhole temperature, resulting in hydrolysis of the fluoro-based small molecule tracer to provide a fluorinated tracer and a nonfluorinated group. The method then includes producing a hydrocarbon fluid at a second well, analyzing the hydrocarbon fluid for a presence of the fluorinated tracer, the fluoro-based small molecule tracer, and the nonreactive tracer, and determining a residual oil saturation of a location of the subterranean formation based on the presence of the fluorinated tracer, the fluoro-based small molecule tracer, and the nonreactive tracer in the hydrocarbon fluid.

Other aspects and advantages of the claimed subject matter will be apparent from the following description and the appended claims.

DETAILED DESCRIPTION

Figure 1:
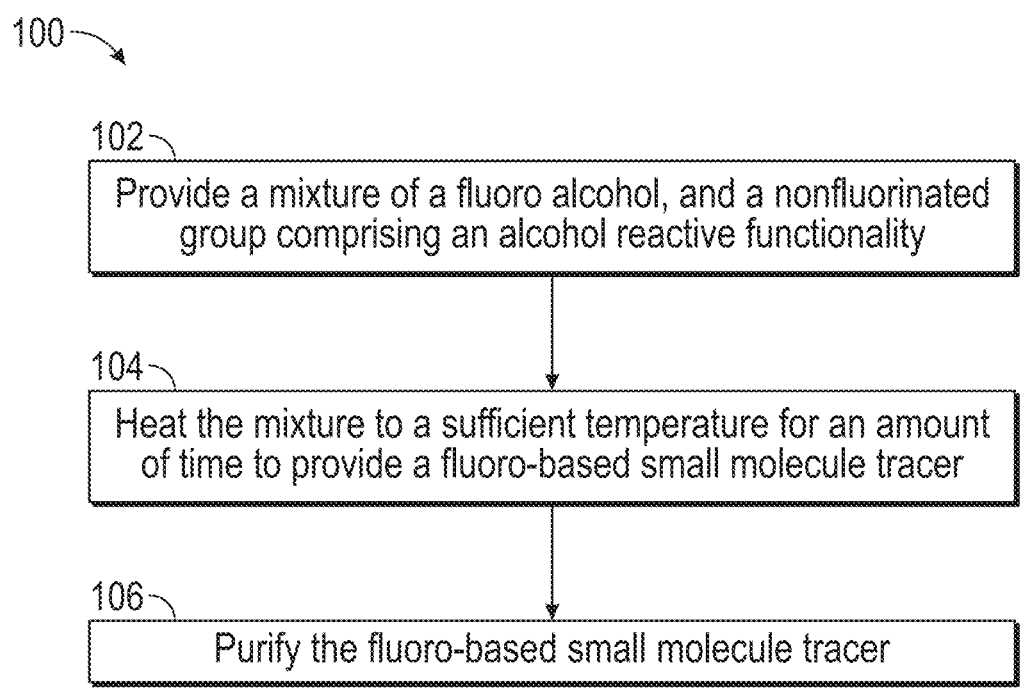
FIG. 1 is a block flow diagram of a method for preparing a fluoro-based small molecule tracer in accordance with one or more embodiments of the present disclosure.

The present disclosure relates to compositions and methods related to a chemical tracer technology for use in oil and gas wells. In some embodiments, compositions are used for monitoring hydrocarbon production from various zones and stages of a subterranean formation. In other embodiments, compositions are used in methods for determining the residual oil saturation in subterranean reservoirs. Compositions disclosed herein include a fluoro-based small molecule tracer including a nonfluorinated group and a fluorinated tracer. The fluoro-based small molecule tracer may contain hydrolyzable bonds. In one or more embodiments, compositions may also include a stimulation fluid. The fluoro-based small molecule may be introduced into the well where, after residing downhole for an amount of time, the tracer may be controllably released via hydrolysis of the hydrolyzable bonds at an elevated downhole temperature. Disclosed compositions may lead to more accurate, less expensive hydrocarbon monitoring as compared to conventional methods.

Fluoro-Based Small Molecule Tracer Composition

In one aspect, embodiments disclosed herein relate to a chemical tracer composition. One or more embodiments of the disclosed composition include a fluoro-based small molecule tracer having a nonfluorinated group and a fluorinated tracer.

The fluorinated tracer may be a fluoro alcohol. Fluoro alcohols that may be suitable for use as tracers in the present disclosure include, but are not limited to, aliphatic fluoro alcohols, cycloaliphatic fluoro alcohols, aromatic fluoro alcohols, heterocyclic fluoro alcohols, fluoroaromatic alcohols, fluorophenols, fluorodiols, and fluoropolyols.

In some embodiments, the fluorinated tracer may be a low-boiling fluoro alcohol. As will be described in greater detail below, such fluorinated tracers may be used to monitor produced gas from various target zones of a subterranean formation. As used herein, "low-boiling fluoro alcohols" are fluoro alcohols that have a boiling point of 90° C. or less. Examples of fluoro-based small molecules may include low-boiling fluoro alcohols as tracers such as trifluoromethanol, trifluoroethanol, 2-fluoroethanol, 2,2,3,3,3-pentafluoro-1-propanol, hexafluoro-2-propanol, nanofluoro-tert-butyl alcohol, 1,1,1,3,3,3-hexafluoro-2-methyl-2-propanol, 1,1,1-trifluoro-2-propanol, among others.

In other embodiments, the fluorinated tracer may be a high-boiling fluoro alcohol. Such tracers may be used to monitor oil production from various target zones of a subterranean formation. As used herein, "high-boiling fluoro alcohols" are fluoro alcohols that have a boiling point above 90° C. Suitable examples of high-boiling alcohols that may be included in fluoro-based small molecules of the present disclosure include, but are not limited to, 2,2-difluoroethanol, 2-fluoroethanol, 2,2,3,3-tetrafluoro-1-propanol, pentafluorophenol, long chain fluoro alcohols having a carbon count of $C_4$-$C_{12}$, 5-fluoro-1H-benzo[d][1,2,3]triazole-6-carboxylic acid, 4-fluoro-phenylcarbamoyl)-3H-imidazole-4-carboxylic acid, 5-fluoro-1H-benzo[d]imidazole-2-carboxylic acid, 2,2,3,3-tetrafluoro-1,4-butanediol, 2,2,3,3,4,4,5,5-octafluoro-1,6-hexanediol, among others.

Other suitable types of fluorinated tracers may include fluorocarboxylic acids, fluoroaromatic carboxylic acids, fluorophenyl carboxylic acids, fluoro amines, fluorothiols, fluoronitrates, fluorotriazoles, fluoroimidazoles, fluoro sulfonic acids, fluoro phosphoric acids and combinations thereof. In particular embodiments the fluorinated tracer is at least one of trifluoroacetic acid, perfluoropropionic acid, perfluorobutanoic acid, 2,6-difluorobenzoic acid, 2-fluorobenzoic acid, 3-fluorobenzoic acid, tetrafluoroterephthalic acid, perfluorotributyl amine, trifluoromethyl amine, trifluoromethyl azoles, fluorotrimethoxy phosphonate, trifluoromethylethylphosphoric acid, 2-fluoroethanolphosphoric acid ether, 4-fluorotriazole, 1-fluorotriazole, trifluoroethyl nitrate, and fluoroalkyl 2-pyrimidyl sulfonate, among others.

As described above, in addition to the fluorinated tracer, the fluoro-based small molecule tracers of the present disclosure also include a nonfluorinated group. In one or more embodiments, the nonfluorinated group is connected to the fluorinated tracer via a hydrolyzable bond. In particular embodiments, the nonfluorinated group is connected to a fluoro alcohol through an ester bond. As such, the nonfluorinated group may include an alcohol reactive functionality such as a carbonyl group, a sulfate group, a phosphate group, and a nitrate group. The nonfluorinated group may also include nonreactive groups such as methyl, ethyl, propyl, butyl, tert-butyl, isobutyl, other alkyl groups having a carbon count of $C_3$-$C_{20}$, benzyl, and phenyl, among others.

In one or more particular embodiments, the nonfluorinated group may include an amine or polyamine. In such embodiments, the amine may be connected to a fluoro alcohol via an ionic bond to provide a quaternary ammonium salt. Such quaternary ammonium salts may help to anchor fluoro alcohol tracer to a surface of the formation once downhole.

Fluoro-based small molecule tracers disclosed herein may be any suitable small molecule including fluorine and hydrolyzable bonds. In one or more embodiments, fluoro-based small molecule tracers have bonds that may undergo hydrolysis at an elevated downhole temperature. Elevated temperatures sufficient to hydrolyze the bonds of disclosed fluoro-based small molecule tracers my range from about 100 to about 350° C. Thus, downhole temperatures may be suitable to initiate hydrolysis of bonds in the tracers described herein. Various fluoro-based small molecule tracers may be included in chemical tracer compositions of one or more embodiments including, but not limited to, fluoro esters such as fluoro alcohol esters and fluoro carboxylic acid esters; fluoro carboxylic acid amides such as 6-fluoropyrazine-2-carboxylic amide, 3-fluoropyridine-2-carboxylic acid amide, and fluoro carboxylic acid amides of formula: $CF_3CONR^1R^2$, where R1 and R2 are each separately an H, a methyl, an ethyl, a benzyl, or an isopropyl group; fluoro alcohol acetals of formula R—O—$CH_2OCH_3$ or R—O—$CH(CH_3)OCH_2CH_3$, where R is a fluoroalkyl group; fluoro alcohol carbonates of formula R—O—$CO_2R$, where R is a fluoroalkyl group, and combinations thereof.

As described above, fluoro-based small molecule tracers may include a nonfluorinated group connected to a fluoro alcohol via an ester bond. Accordingly, in one or more particular embodiments, the fluoro-based small molecule tracer is a fluoro ester. Examples of suitable fluoro esters include, but are not limited to, $CF_3COCH_2CO_2CH_2CH_3$, $CHF_2COCH_2CO_2CH_2CH_3$, $CF_3CO_2CH_2CH_3$, $CHF_2CO_2CH_2CH_3$, $C_7F_{15}CO_2CH_2C_3F_7$, $C_3F_7CO_2CH_2CF_3$, $C_2F_5CO_2CH_3$, $CF_3CF_2CO_2CH_2CH_3$, $CF_3(CF_2)_3CO_2CH_2CH_3$, $CH_3(CF_2)_4CO_2CH_2CH_3$, $C_6F_{11}CO_2CH_2CH_3$, $C_6H_6CO_2C_6F_5$, p-nitrophenyl trifluoroacetate, phenyl trifluoroacetate, and p-chlorophenyl trifluoroacetate.

In one or more embodiments, fluoro-based small molecule tracers of the present disclosure may be encapsulated in a degradable material. Fluoro-based small molecule tracers may be encapsulated to further delay the release of the fluoro-alcohol tracers in produced gas. The degradable material may be a hydrolyzable polymer. For example, fluoro-based small molecule tracers may be encapsulated in a hydrolyzable polymer such as polylactic acid (PLA), polyglycolide (PGA), polyorthoester, polyamide, polycaprolactam, polycaprolactone, polyphosphorazine, polyesteramide, and combinations thereof. In one or more embodiments, the fluoro-based small molecule tracer is encapsulated via matrix encapsulation. In other embodiments, the fluoro-based small molecule tracer may be encapsulated using an emulsion polymerization technique as known in the art. Similarly, fluoro-based small molecule tracers may be blended, mixed, or reacted with polymers including, but not limited to, melamine formaldehyde resin, urea formaldehyde resin, polyurethane resin, phenolic formaldehyde resin, epoxy resin, polyester resin, polycarbonate resin, and combinations thereof. Such mixtures or blends may be formed into solid parts and installed downhole near a target zone of the subterranean formation. For example, fluoro-based small molecule tracer/polymer mixtures or blends may be formed into rods, buttons, sleeves, and pipes, among others. As such, the encapsulating polymer may be in contact with produced fluid from the target zone, causing it to degrade over time, and eventually releasing the fluoro-based small molecule tracers into the produced fluid. In some embodiments, the solid parts are installed on the outside of production tubing at or near the target zone. In other embodiments, the solid parts are installed in perforations of the target zone. As would be appreciated by one of ordinary skill in the art, the solid parts may be installed in different locations at or near the target zone provided that the encapsulating polymer is degraded by produced fluid from the target zone, so that the production from that specific zone may be determined.

In chemical tracer compositions in which the fluoro-based small molecule tracer is encapsulated in or mixed with a polymer or polymeric resin, the fluoro-based small molecule tracer may be present in an amount of 1 to 10 wt % based on the total amount of polymer or polymeric resin. For example, in one or more embodiments, the fluoro-based small molecule tracer may be encapsulated in a polymer or polymeric resin in an amount having a lower limit of any of 1, 2, 3, 4, and 5 wt %, and an upper limit of any of 6, 7, 8, 9, and 10 wt %, where any lower limit may be paired with any mathematically compatible upper limit.

Fluoro-based small molecule tracers encapsulated in or mixed with a polymer may be in the form of a particle. Such polymer/tracer particles may have a size ranging from 1 nm to 100 μm. For example, embodiment polymer/tracers may have a size having a lower limit of any of 1, 10, 50, 100, 250, 500, and 800 nm and an upper limit of any of 1, 5, 10, 25, 50, 75 and 100 μm, where any lower limit may be paired with any mathematically compatible upper limit.

Injection Fluid Composition

Fluoro-based small molecule tracers in accordance with the present disclosure may be included in an injection fluid for use downhole. In its simplest form, the injection fluid may be a fluoro-based small molecule tracer. In other forms, the injection fluid may include a base fluid and optionally other additives, along with a fluoro-based small molecule tracer.

The injection fluid may be a fluid used for formation stimulation, enhanced oil recovery, chemical tracer tests, or water flooding operations. The fluoro-based small molecule may be included in an injection fluid in a concentration ranging from 0.8 to 1.2 vol % (volume percent) based on the total volume of the injection fluid. For example, in embodiments in which a fluoro-based small molecule is added to an injection fluid, the injection fluid may include the fluoro-based small molecule in a concentration having a lower limit of any of 0.80, 0.85, 0.9, 0.95, and 1.0 vol % and an upper limit of any of 1.0, 1.05, 1.10, 1.15, and 1.2 vol %, where any lower limit may be paired with any mathematically compatible upper limit.

One or more embodiments of the injection fluid include an aqueous-base fluid. The aqueous base fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the injection fluid. In some embodiments, the aqueous-base fluid may be an aqueous phase in an emulsion having an oil-based continuous phase, such as a diesel continuous phase. In such embodiments, once the emulsion breaks downhole, the aqueous phase will be separated from the oil-based phase, thereby releasing the aqueous phase downhole.

In one or more embodiments, the injection fluid may contain water in a range of from about 50 wt % to 97 wt % based on the total weight of the stimulation fluid. In one or more embodiments, the embodiment injection fluid may comprise greater than 70 wt % water based on the total weight of the injection fluid.

In one or more embodiments, the injection fluid is a stimulation fluid. Disclosed fluoro-based small molecule tracers may be suitable for use in any stimulation fluid. In one or more embodiments, the stimulation fluid is an acidizing fluid, a fracturing fluid, a hydraulic fracturing fluid, an emulsified acid, a viscoelastic surfactant, a foamed fluid, a linear gel, and a crosslinked gel, among others. In particular embodiments, fluoro-based small molecule tracers are added to acidizing fluid or fracturing fluid.

In some embodiments, the stimulation fluid may incorporate an acid in the aqueous base fluid. The acid may include an inorganic acid, an organic acid, or both. The inorganic acid may include, but is not limited to, hydrochloric acid, nitric acid, hydrofluoric acid, hydrobromic acid, perchloric acid, fluoroboric acid, or derivatives, and mixtures thereof. The organic acid may include, but is not limited to, formic acid, acetic acid, citric acid, lactic acid, sulfamic acid, chloroacetic acid methanesulfonic acid, or derivatives, and mixtures thereof. Acid-producing systems may include, but are not limited to, esters, lactones, anhydrides, orthoesters, polyesters or polyorthoesters. The acid-producing systems may include esters of short chain carboxylic acids, including, but not limited to, acetic and formic acid, and esters of hydroxycarboxylic acids, including, but not limited to, glycolic and lactic acid. These acid-producing systems may provide the corresponding acids when hydrolyzed in the presence of water. The acid may be present in an aqueous base fluid at a concentration ranging from about 1 to about 70 wt % (weight percent). For example, the aqueous base fluid may have an acid in an amount having a lower limit of any of 1, 5, 10, 15, 20, 25, 30 and 40 wt % and an upper limit of any of 40, 45, 50, 55, 60, 65, and 70 wt %, where any lower limit may be paired with any mathematically compatible upper limit.

Injection fluids that include an acid in the aqueous based fluid may include a fluoro-based small molecule tracer that has a slower rate of hydrolysis. As such, the fluoro-based small molecule tracer may not be hydrolyzed by the acid. Suitable fluoro-based small molecule tracers for use in injection fluids including an acid may be hydrophobic fluoro esters having a long alkyl or fluoroalkyl chain.

In embodiments in which the injection fluid is a stimulation fluid, a suitable amount of a fluoro-based small molecule tracer may be included in the stimulation fluid. The amount of fluoro-based small molecule may be adjusted depending on the type of fluorinated tracer in the fluoro-based small molecule tracer. In one or more embodiments, the stimulation fluid may include from 0.1 to 50 gpt (gallons per thousand gallons) of the fluoro-based small molecule relative to the total amount of stimulation fluid. For example, the stimulation fluid may include a fluoro-based small molecule in an amount having a lower limit of any of 0.1, 0.5, 1.0, 5.0, 10, 15, and 20 gpt and an upper limit of any of 20, 25, 30, 35, 40, 45, and 50 gpt, where any lower limit may be paired with any mathematically compatible upper limit.

In one or more embodiments, when the stimulation fluid is a fracturing fluid, the fracturing fluid includes a proppant.

Proppants are often included in fracturing fluids to help keep fractures open and are capable of supporting the flow of hydrocarbons from a subterranean formation to a wellbore. Such proppants may include gravel, sand, bauxite, or glass beads. Any type of proppant may be added to the fracturing fluid. In one or more embodiments, the proppant is coated with a fluoro-based small molecule tracer. In some embodiments, the proppant is coated with a fluoro-based small molecule tracer that is encapsulated in a degradable polymer, as described above. Such embodiments may include the fluoro-based small molecule tracer in an amount ranging from 1.0 to 10 wt % based on the total amount of proppant. For example, in a proppant/tracer mixture, the fluoro-based small molecule tracer may be present in an amount having a lower limit of any of 1.0, 2.0, 3.0, 4.0, 5.0, and 6.0 wt % and an upper limit of any of 5.0, 6.0, 7.0, 8.0, 9.0, and 10 wt % based on the weight of the proppant, where any lower limit may be paired with any mathematically compatible upper limit.

In fracturing fluid compositions that include a proppant, the proppant may be included in an amount ranging from 1 to 10 lb/gal (pounds per gallon) relative to the amount of stimulation fluid. For example, the proppant may be present in the fracturing fluid in an amount having a lower limit of any of 1, 2, 3, 4, and 5 lb/gal and an upper limit of any of 6, 7, 8, 9, and 10 lb/gal where any lower limit may be paired with any mathematically compatible upper limit.

In one or more embodiments, the stimulation fluid may optionally include additional additives. Examples of such additional additives may include, but are not limited to, emulsifiers, friction reducers, fibers, oxidizing agents, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, foamers, gases, derivatives thereof, and combinations thereof.

Method for Preparing Fluoro-Based Small Molecule Tracers

One or more embodiments of the present disclosure relate to a method for preparing the previously described chemical tracer compositions. An exemplary method 100 is shown in FIG. 1. Method 100 includes providing a mixture of a fluoro alcohol and a nonfluorinated compound 102. As described above, the nonfluorinated group may include an alcohol reactive functionality. The mixture may then be heated to an elevated temperature for an amount of time, to provide a fluoro-based small molecule tracer 104. Any suitable elevated temperature may be used provided that it is sufficient to facilitate a reaction between the alcohol and the nonfluorinated compound. The amount of time may be sufficient to enable complete conversion of the alcohol and the nonfluorinated compound to a fluoro-based small molecule.

After reacting the fluoro alcohol and the nonfluorinated group at an elevated temperature for an amount of time, the mixture may be cooled and purified 106.

For example, in one or more embodiments, fluoro-based small molecule tracers may be prepared from a fluoro alcohol and an acyl chloride as shown below in Scheme I:

Scheme (I)

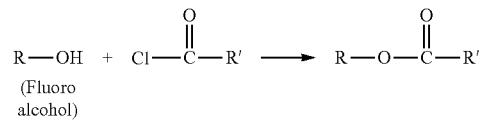

(Fluoro alcohol)

where R is $CF_3$, $C(CF_3)_3$, $CH_2CF_3$, $CH(CF_3)_2$, $C(CH_3)(CF_3)_3$, $CH(CH_3)(CF_3)$, or $C_2$-$C_{20}$ fluoro alkyl and;
R' is $CH_3$, $CH_2CH_3$, $CH_2CH_2CH_3$, $CH_2(CH_2)_2CH_3$, $C(CH_3)_3$, $CH_2CH(CH_3)_2$, $C_2$-$C_{20}$ alkyl, $C_6H_5$, or $CH_2(C_6H_5)$. In one or more embodiments, a base may be added to the reaction shown in Scheme I to increase the reaction rate. Suitable bases that may be included in the synthesis shown in Scheme I include pyridine, triethylamine, and a combination thereof.

In other embodiments, fluoro-based small molecule tracers may be prepared from a fluoro alcohol and a carboxylic acid as shown below in Scheme II:

Scheme (II)

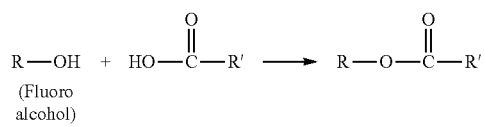

(Fluoro alcohol)

where R and R' are as previously described. In one or more embodiments, an acid may be added to the reaction shown in Scheme II to increase the reaction rate. Any suitable acid may be used, including, for example, sulfuric acid, tosic acid, and a combination thereof.

Method for Monitoring Produced Oil and/or Gas

In another aspect, one or more embodiments relate to a method for monitoring produced hydrocarbons from a target zone of a subterranean formation using previously described fluoro-based small molecule tracers.

Figure 2:
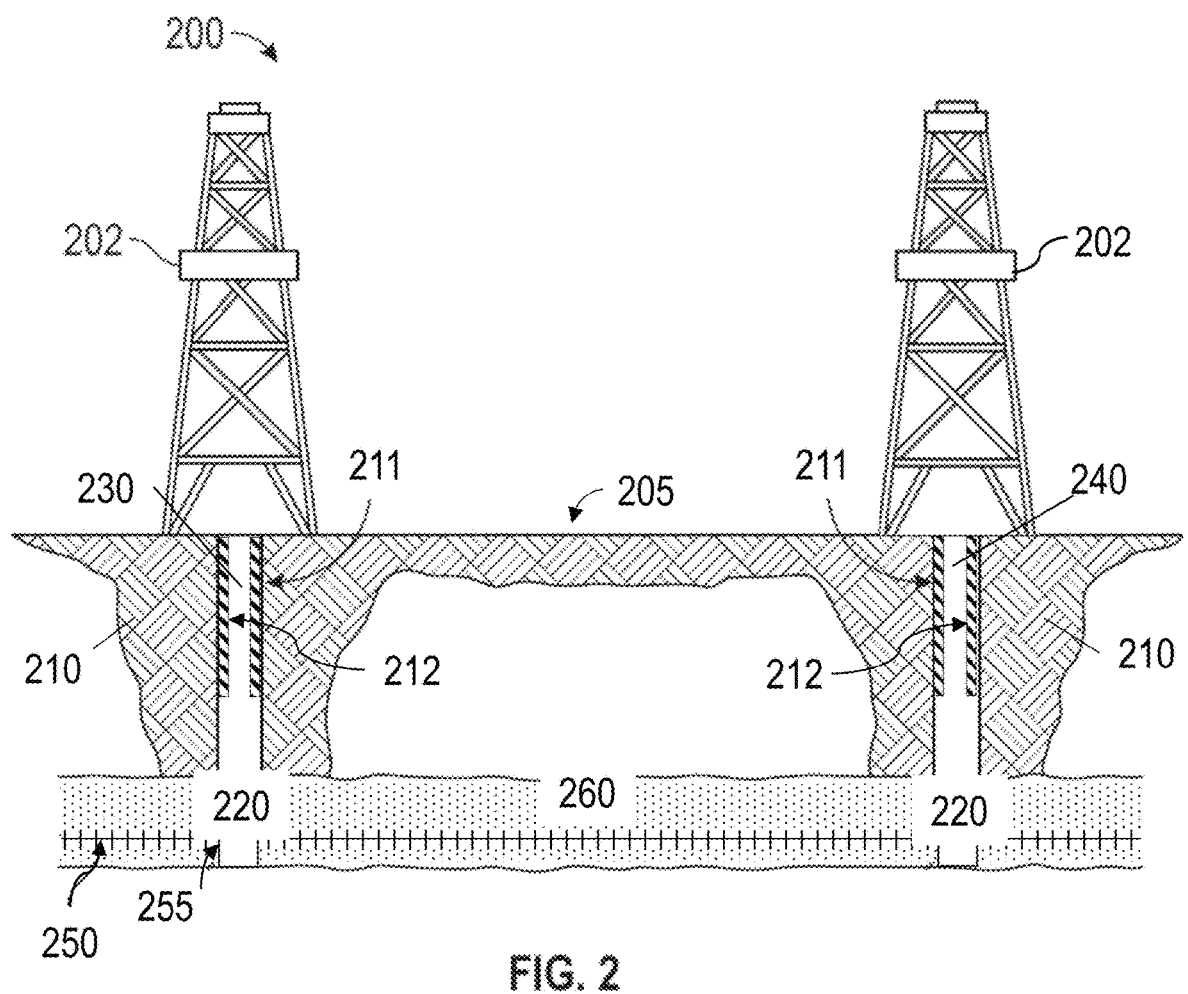
FIG. 2 is a depiction of a well environment in accordance with one or more embodiments of the present disclosure.

FIG. 2 illustrates a well environment 200 in accordance with one or more embodiments of the present disclosure. Well environment 200 includes a first well 230 and a second well 240. Well environment 200 includes surface 205 and subsurface 210. Subsurface 210 is depicted having a casing 212 and a wellbore wall 211 that extend downhole from surface 205 into subsurface 210 and defines a wellbore 220. The well environment includes wellhead 202 at surface 205. Subsurface 210 includes an inter-well region 260. Subsurface 210 also includes a target zone 250 in which the fluoro-based small molecule tracer is injected, and subsequently the gas production is monitored. Target zone 250 has formation face 255 that fluidly couples target zone 250 with wellbore 220 into subsurface 210 and towards target zone 250.

With the configuration in FIG. 2, the previously described fluoro-based small molecule tracers may be introduced into subsurface 210 and towards target zone 250 via pump 217 through valves located in wellhead 202. Hydrocarbon-bearing formations may include oleaginous fluid, such as crude oil, dry gas, wet gas, gas condensates, light hydrocarbon liquids, tars, and asphalts, as well as other hydrocarbon materials. Hydrocarbon-bearing formations may also include aqueous fluid such as water and brines. Embodiment fluoro-based small molecules may be appropriate for use in different types of subterranean formations, such as carbonate, shale, sandstone, and tar sands.

Figure 3:
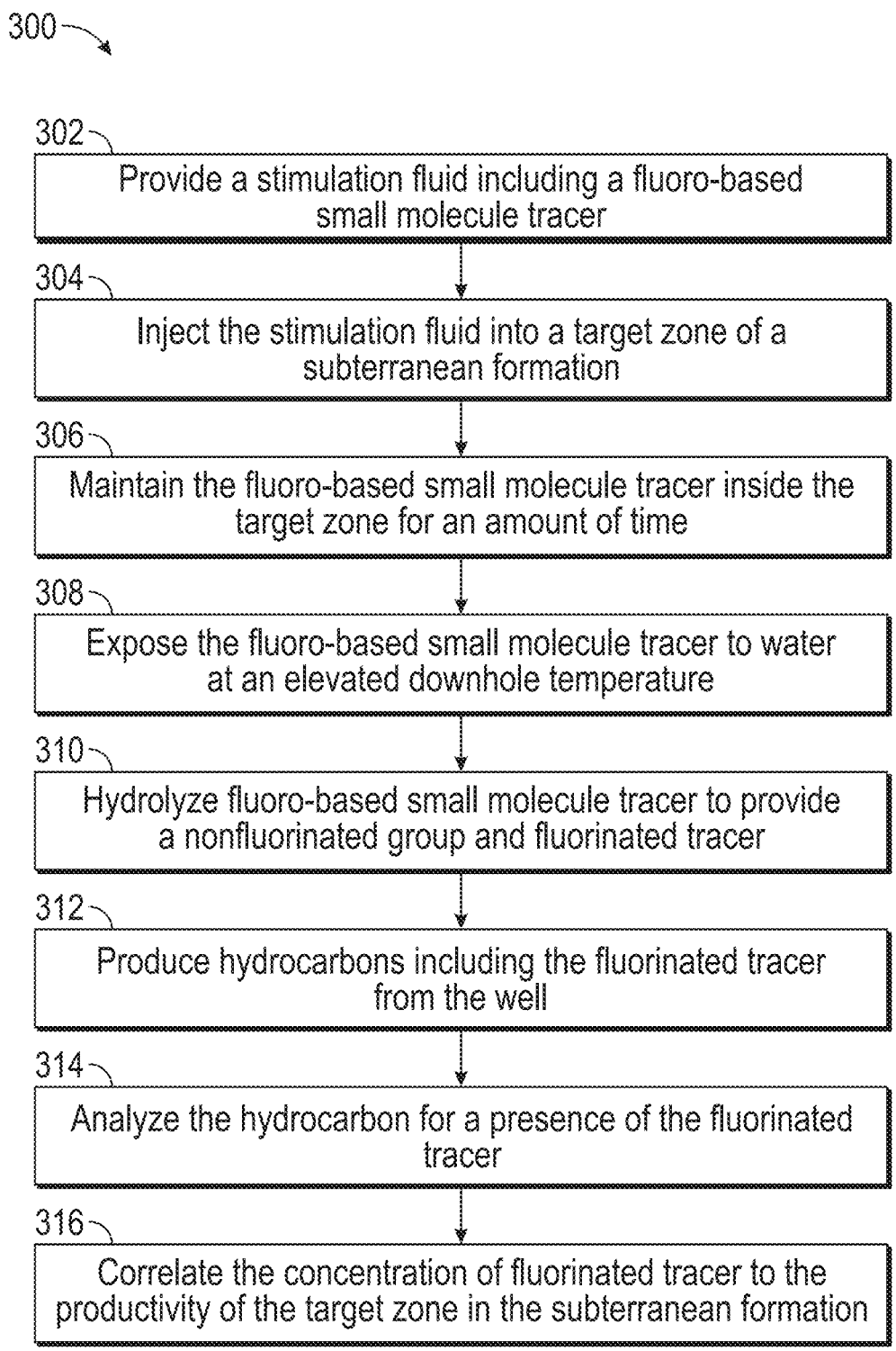
FIG. 3 is a block flow diagram of a method for monitoring the production of hydrocarbons from a subterranean formation using fluoro-based small molecule tracers in accordance with one or more embodiments of the present disclosure.

A method for monitoring oil and/or gas production from a target zone 250 of a reservoir in accordance with one or more embodiments is shown in and discussed with reference to FIG. 3. Method 300 includes providing a fluoro-based small molecule tracer in a stimulation fluid 302. The fluoro-based small molecule tracer is as previously described. The specific fluoro-based small molecule tracer may be chosen based on the reservoir characteristics such as temperature and humidity, and based on the type of reservoir (i.e., oil or gas). For example, a fluoro-based small molecule tracer prepared using a low-boiling fluoro alcohol may be used in a gas reservoir, whereas a fluoro-based small molecule tracer may be used in an oil reservoir.

In method 300, the stimulation fluid including a fluoro-based small molecule may then be injected into target zone 250 through the wellbore 304. The stimulation fluid may be a fracturing fluid or an acidizing fluid. The amount of stimulation fluid injected into target zone 250 may range from 200,000 to 1,000,000 gallons. For example, in one or more embodiments, the amount of stimulation fluid injected into target zone 250 may have a lower limit of any of 200,000, 250,000 300,000, 400,000, 500,000 gallons and an upper limit of any of 600,000, 700,000, 800,000, 900,000 and 1,000,000 gallons, where any lower limit may be paired with any mathematically compatible upper limit.

After being injected into the formation, the fluoro-based small molecule may reside in target zone 250 for an amount of time 306. The amount of time may be dictated by the size and structure of the fluoro-based small molecule tracer. For example, fluoro-based small molecule tracers including a nonfluorinated group that has a long alkyl chain may remain in the formation for several months due to the hydrophobic nature and high boiling point of the nonfluorinated group. In some embodiments, the fluoro-based small molecule may reside in target zone 250 for several weeks to months. For example, fluoro-based small molecules may reside in the target zone for an amount of time ranging from a lower limit of one of 1, 2, 3, 4, 5, and 6 weeks to an upper limit of one of 7, 8, 9, 10, and 12 weeks, where any lower limit may be paired with any mathematically compatible upper limit.

After the amount of time, the fluoro-based small molecule tracer may come into contact with water at an elevated downhole temperature 308. In one or more embodiments, the fluoro-based small molecule tracer comes into contact with water at an elevated downhole temperature, typically ranging from about 70 to about 150° C. Subsequently, the fluoro-based small molecule tracer may be hydrolyzed to provide a nonfluorinated group and a fluorinated tracer 310. The fluorinated tracer of one or more embodiments is a fluoro alcohol tracer as previously described. In embodiment methods in which the reservoir is a gas reservoir, the fluoro alcohol tracer may have a boiling point at or below the downhole temperature of target zone 250. As such, once released via hydrolysis of the fluoro-based small molecule tracer, the fluoro alcohol tracer may undergo a liquid-to-gas phase change to provide a gaseous tracer. The gaseous fluoro alcohol tracer may then travel to surface 205, where it may be collected with produced fluid from the target zone 312. The produced fluid may include one or more of liquid hydrocarbons, gaseous hydrocarbons, other gases, aqueous fluids, and other downhole chemicals. In one or more particular embodiments, the produced fluid is gaseous hydrocarbons. The gaseous fluoro alcohol tracer may be collected using any suitable gas collection device known in the art, such as a wellhead sampling manifold, gas sampling bottles, and other commercially available devices. The produced fluid may be analyzed for a presence of the gaseous fluoro alcohol tracer 314. The concentration of the gaseous fluoro alcohol tracer present in the produced gas may be used to determine the productivity of target zone 250 in the subterranean formation 316. Various methods for detecting the gaseous fluoro alcohol tracer may be used such as HPLC, GC, NMR, UV, MS, and FTIR.

Alternatively, in embodiment methods in which the reservoir is an oil reservoir, the fluoro alcohol tracer may have a boiling point above the downhole temperature of target zone 250. In such methods, the fluoro alcohol tracer may be soluble in the hydrocarbon fluid present in the well. As above, after hydrolysis of the fluoro-based small molecule, the fluoro alcohol tracer may travel to surface 205 in the produced fluid 312. In such embodiments, the produced fluid is liquid hydrocarbons. The produced fluid may be monitored for a presence of fluoro alcohol tracer 314. Fluoro alcohol tracers may be detected and/or analyzed by techniques such as HPLC, GC, NMR, UV, MS, and IR. Detected fluoro alcohol tracers may then be extracted from the hydrocarbon fluid according to various techniques known in the art. The concentration of the fluoro alcohol tracer present in the produced fluid may be used to determine the productivity of target zone 250 in the subterranean formation 316.

In one or more embodiments, multiple stages of stimulation, in a target zone, may be performed. A unique fluoro-based small molecule tracer may be injected into each stimulation stage of a target zone. For example, a first fluoro-based small molecule tracer may be injected into a first stimulation stage of a first target zone. Then, a second fluoro-based small molecule tracer may be injected into a second stimulation stage of the first target zone. The number of stimulation stages in a given target zone is not particularly limited. Likewise, as would be appreciated by one of ordinary skill in the art, a given subterranean formation may have multiple target zones with multiples stages in each zone. Accordingly, produced hydrocarbons from the first target zone may contain both the first fluoro-based small molecule tracer and the second fluoro-based small molecule tracer. In one or more embodiments, the first fluoro-based small molecule tracer and the second fluoro-based small molecule tracer will be present in the produced hydrocarbons at different concentrations. The concentration of the first fluoro-based small molecule tracer may indicate the production from the first stimulation stage of the first target zone, whereas the concentration of the second fluoro-based small molecule tracer may indicate the production from the second stimulation stage from the first target zone. The tracer concentration may be integrated with the water and oil production rates to yield a total mass of tracer recovered from each zone. The ratio of recovered tracer mass to the total injected tracer mass may be used to determine the fluid cleanup efficiency and oil tracer recovery at a given target zone of a given stimulation stage. The concentrations of the recovered tracers in the produced hydrocarbons may be compared to provide the stage inflow contribution of stimulation fluid and hydrocarbon production.

Method for Determining Residual Oil Saturation

In yet another aspect, the present disclosure relates to methods for determining residual oil saturation in a target zone of a subterranean formation using previously described fluoro-based small molecule tracers. One or more embodiments relate to methods for determining residual oil saturation in a single well. Other embodiments relate to methods for determining residual oil saturation in an inter-well region between two or more reservoirs. Such embodiment methods may also provide information related to inter-well connectivity.

Figure 4:
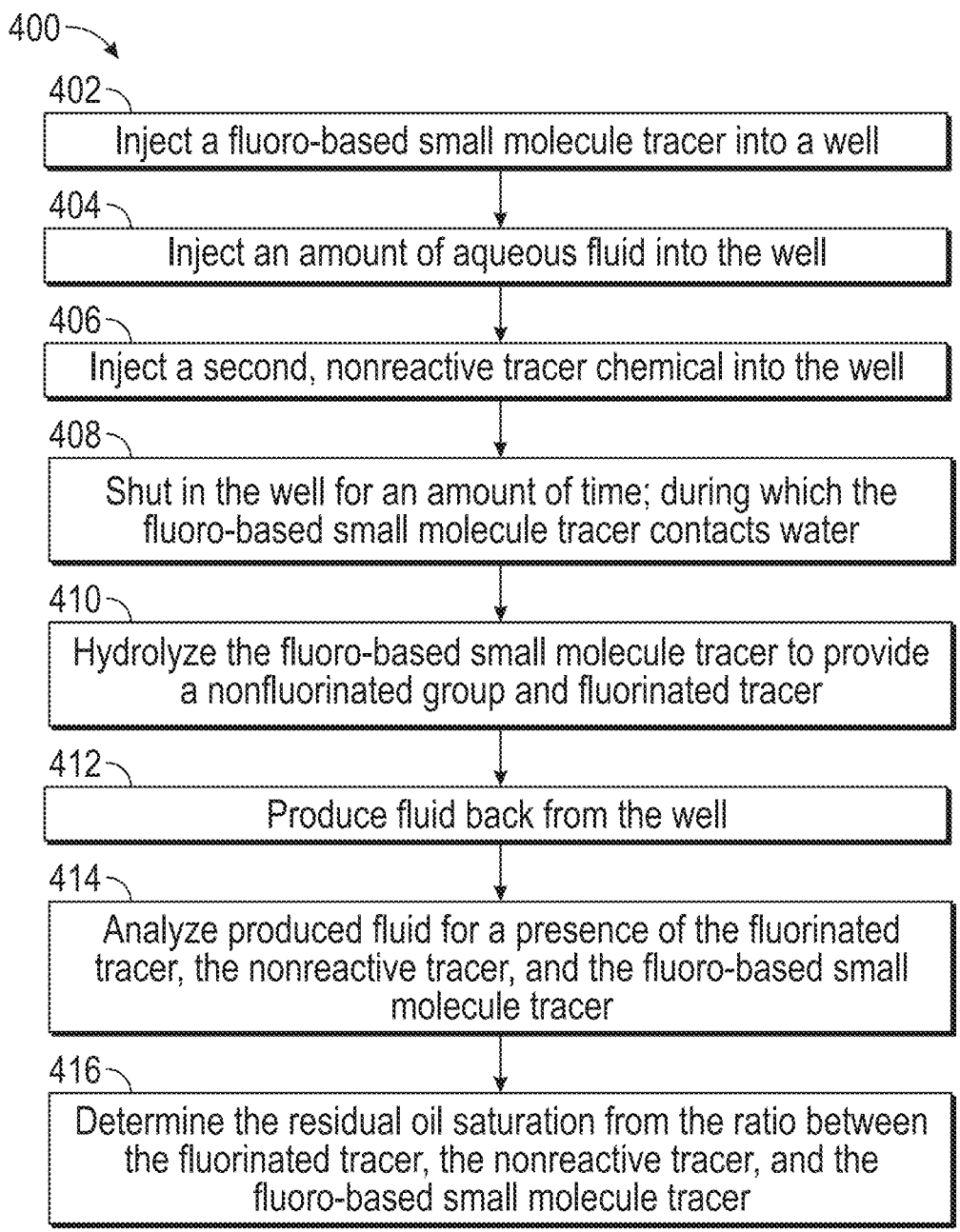
FIG. 4 is a block flow diagram of a method for a single well chemical tracer test using fluoro-based small molecule tracers in accordance with one or more embodiments of the present disclosure.

In one or more embodiments, previously described fluoro-based small molecule tracer compositions are used in single well chemical tracer tests to determine residual oil in a single well. Method 400, detailing a single well chemical tracer test in accordance with one or more embodiments of the present disclosure, is shown in FIG. 4. In method 400, a fluoro-based small molecule tracer is injected into the well 402. The fluoro-based small molecule tracer may be soluble in both water and oil. The extent to which such tracers are soluble in oil as compared to water may be described using a partitioning coefficient. The partitioning coefficient is the ratio between the concentration of the chemical in the water phase and the oil phase ($k_p = C_{oil}/C_{water}$). A tracer that partitions strongly into the oil phase (i.e., has a large partitioning coefficient) would prolong the test duration. On the other hand, a tracer with a small partitioning coefficient makes discerning the differences in mean residence times difficult. As such, a fluoro-based small-molecule tracer that is soluble in both water an oil may be selected based on its partitioning coefficient. In particular embodiments, the fluoro-based small molecule may be encapsulated in or mixed with a polymer, as previously described.

In one or more embodiments, the fluoro-based small molecule tracer may be injected in an amount ranging from 5 to 1,000 kg (kilograms). For example, methods may include injecting a fluoro-based small molecule in an amount having a lower limit of any of 5, 10, 25, 50, 100, 150, 200, 250, 300, and 350 kg and an upper limit of any of 400, 450, 500, 550, 600, 650, 700, 750, 800, 850, 900, 950, and 1,000 kg where any lower limit may be paired with any mathematically compatible upper limit.

In some embodiments, the fluoro-based small molecule may be injected into the well neat. In other embodiments, the fluoro-based small molecule may be added to an injection fluid and then injected into the well. The injection fluid may be a fluid used for formation stimulation, enhanced oil recovery, or water flooding operations. The fluoro-based small molecule may be included in an injection fluid in a concentration ranging from 0.8 to 1.2 vol % (volume percent) based on the total volume of the injection fluid. For example, in embodiments in which a fluoro-based small molecule is added to an injection fluid, the injection fluid may include the fluoro-based small molecule in a concentration having a lower limit of any of 0.80, 0.85, 0.9, 0.95, and 1.0 vol % and an upper limit of any of 1.0, 1.05, 1.10, 1.15, and 1.2 vol %, where any lower limit may be paired with any mathematically compatible upper limit.

After injecting the first tracer chemical, an amount of aqueous fluid is injected into the well 404. In one or more embodiments, the aqueous phase may be water or brine. The amount of aqueous fluid injected into the well may depend on a radius and a depth of the well. In one or more embodiments, the amount is 4 to 6 times the amount of fluoro-based small molecule injected into the well. The amount of aqueous phase may range from 20 to 6,000 kg. For example, an aqueous phase may be injected into the well in an amount having a lower limit of any of 20, 50, 100, 250, 500, 1,000, 1,500, and 2,000 kg and an upper limit of any of 2,500, 3,000, 3,500, 4,000, 4,500, 5,000, 5,500 and 6,000 kg, where any lower limit may be paired with any mathematically compatible upper limit.

In method 400, a second, nonreactive tracer chemical is introduced into the well 406. The nonreactive tracer chemical may be injected with the fluoro-based small molecule and the aqueous fluid, at a concentration of 0.25 to 1.20 vol %. For example, in some embodiments, the nonreactive tracer is injected at a concentration ranging from a lower limit of any of 0.25, 0.30, 0.35, 0.40, 0.50, and 0.60 vol % to an upper limit of any of 0.70, 0.80, 0.90, 1.00, 1.10, and 1.20 vol %, where any lower limit may be paired with any mathematically compatible upper limit. Any nonreactive tracer chemical may be used. In one or more embodiments, the nonreactive tracer chemical is propyl alcohol, isopropyl alcohol, fluorobenzoic acid, trifluoromethanol, or a combination thereof.

After the tracers are introduced into the well, method 400 includes shutting-in the well for an amount of time (i.e., a shut-in time) 408. Depending on the temperature downhole and the kinetics of the specific fluoro-based small molecule tracer used, the shut-in time may range from 1 to 10 days. For example, the well may be shut in for an amount of time having a lower limit of any of 1, 2, 3, 4, and 5 days and an upper limit of any of 6, 7, 8, 9, and 10 days, where any lower limit may be paired with any mathematically compatible upper limit. During the shut-in time, the fluorinated tracer reacts with water downhole to produce a measurable amount of a fluorinated tracer 410. In one or more embodiments, the fluorinated tracer is a fluoro-alcohol as previously described. The measurable amount of fluorinated tracer may range from 10 to 50% based on the initial amount of fluoro-based small molecule. For example, the fluoro-based small molecule may be converted to a fluorinated tracer in a percent ranging from a lower limit of any of 10, 15, 20, 25, and 30%, to an upper limit of any of 30, 35, 40, 45, and 50%, where any lower limit may be paired with any mathematically compatible upper limit.

After the shut-in period, fluid is produced back from the well 412. The produced fluid may include one or more of gaseous hydrocarbons, liquid hydrocarbons, aqueous liquids, and other downhole chemicals. The produced fluid is periodically sampled and analyzed for a presence of fluorinated tracer, unreacted fluoro-based small molecule tracer, and nonreactive tracer 414. The ratio of the components, as well as the partitioning coefficient of the fluoro-based small molecule tracer, may be used to determine residual oil saturation 416 according to methods known by those with skill in the art. Before back production of the well, the two tracers may be located at the same distance from the well. When the well is opened for production, as in method 400, the residual fluoro-based small molecule tracer lags relative to the produced fluorinated tracer. This is due to the partitioning of the fluoro-based small molecule tracer between the mobile aqueous phase and the stationary residual hydrocarbon phase. Thus, through monitoring effluent concentrations of the fluoro-based small molecule and fluorinated tracers, the residual oil saturation may be determined from the time lag of the two peaks or from the shape of the breakthrough curves via curve fitting techniques known in the art.

The nonreactive tracer may be used to identify an ester-water bank, i.e., a portion of the reservoir where the ester-water saturation is increased, or for interpretation of the single well chemical tracer test if all of the fluoro-based small molecule tracer hydrolyzes downhole.

An oil-water partitioning coefficient (K-value) of fluoro-based small molecules disclosed herein may be measured in a laboratory prior to use in a single well chemical tracer test. The K-value is measured at reservoir temperature using samples of crude reservoir oil and test water. The K-value may be measured experimentally according to various methods known in the art, such as shake-flask and HPLC. Alternatively, the K-value may be estimated by calculation according to methods known in the art such as fragment-based calculation and atom-based calculation. The K-value may be sensitive to reservoir conditions including the salinity of the brine, reservoir temperature, pH, and concentration of the fluoro-based small molecule. As such, a volume of water or brine may be added to the well after the fluoro-based small molecule tracer in order to return the reservoir to its original salinity and/or pH, as is done in step 402 of method 400. The K-value of fluoro-based small molecule tracers of one or more embodiments may range from 2 to 8. For example, a fluoro-based small molecule tracer in accordance with the present disclosure may have a K-value having a lower limit of any of 2, 2.5, 3, 3.5, 4, 4.5, and 5 and an upper limit of any of 5, 5.5, 6, 6.5, 7, 7.5, and 8, where any lower limit may be paired with any mathematically compatible upper limit.

Figure 5:
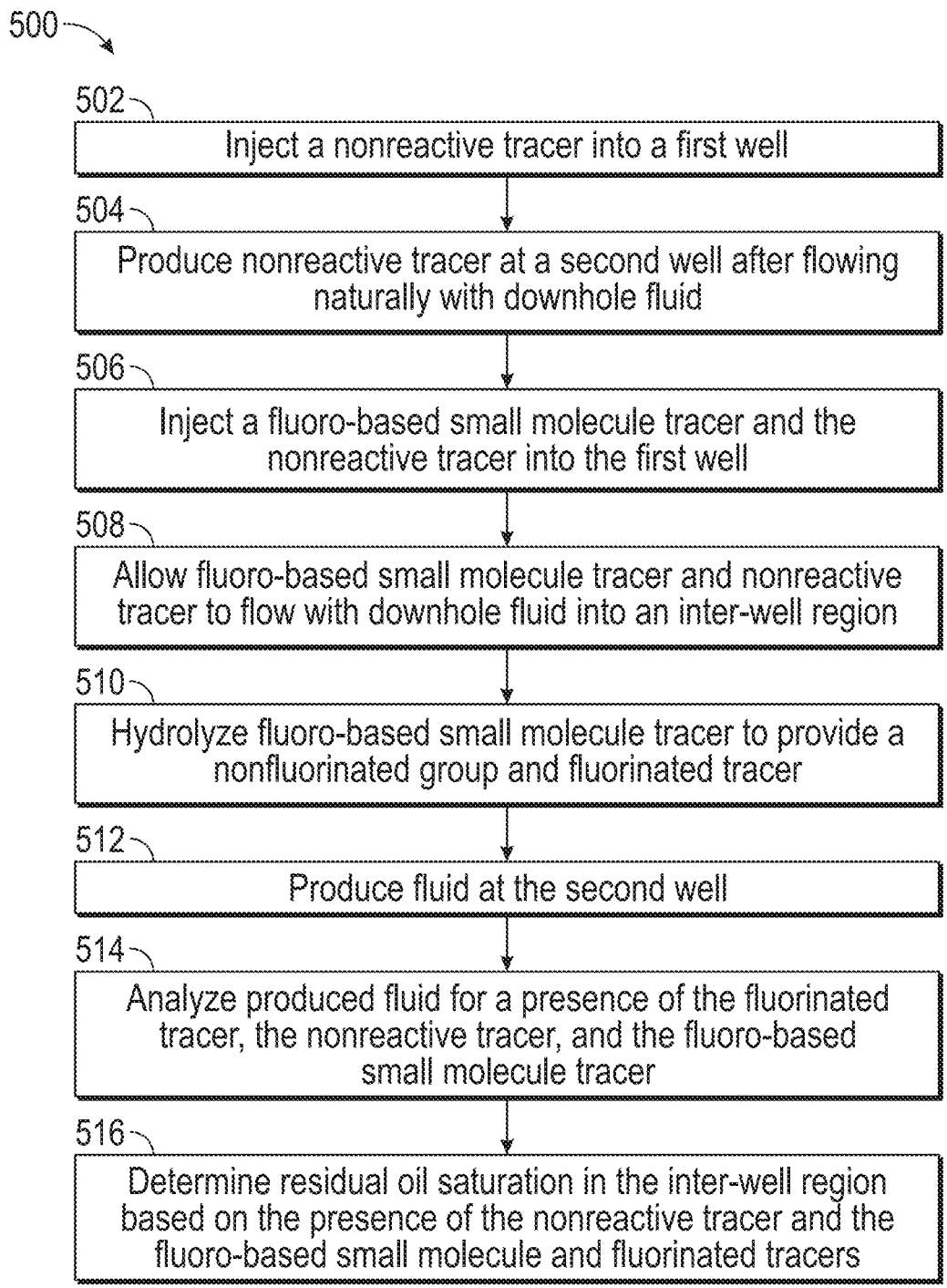
FIG. 5 is a block flow diagram of a method for an inter-well chemical tracer test using fluoro-based small molecule tracers in accordance with one or more embodiments of the present disclosure.

As stated above, one or more embodiments relate to methods for determining residual oil saturation in an inter-well region between two or more reservoirs using previously described fluoro-based small molecule tracers. As such, fluoro-based small molecule tracers may be used as tracers in partitioning inter well tracer tests. Method 500, shown in FIG. 5, describes an exemplary partitioning inter well tracer test using the disclosed fluoro-based small molecule tracers. In one or more embodiments, a fluoro-based small molecule tracer and a nonreactive tracer, as described above with respect to method 400, are introduced into a first well and produced from a second well after an amount of time.

In particular, method 500 includes injecting a nonreactive tracer into a first well 502. The nonreactive tracer of one or more embodiments is a fluoro alcohol as previously described with respect to the composition of the fluoro-based small molecule. The nonreactive tracer may be injected neat, or as a solution in an injection fluid. The injection fluid may be any aqueous-based injection fluid. For example, the injection fluid of one or more embodiments may be water, brine, alkaline water, surfactant-based aqueous fluid, or polymer-based aqueous fluid. In particular embodiments, the injection fluid may be a $CO_2$ based fluid.

In one or more embodiments, the nonreactive tracer may be injected in an amount ranging from 5 to 1,000 kg. For example, methods may include injecting a nonreactive tracer molecule in an amount having a lower limit of any of 5, 10, 25, 50, 100, 150, 200, 250, 300, and 350 kg and an upper limit of any of 400, 450, 500, 550, 600, 650, 700, 750, 800, 850, 900, 950, and 1,000 kg where any lower limit may be paired with any mathematically compatible upper limit.

In embodiments in which a nonreactive tracer is included in an injection fluid, the injection fluid may have a concentration of nonreactive tracer ranging from 0.8 to 1.2 vol % (volume percent) based on the total volume of the injection fluid. For example, the injection fluid may include the nonreactive tracer in a concentration having a lower limit of any of 0.80, 0.85, 0.9, 0.95, and 1.0 vol % and an upper limit of any of 1.0, 1.05, 1.10, 1.15, and 1.2 vol %, where any lower limit may be paired with any mathematically compatible upper limit.

Once injected into a first well, the nonreactive tracer may flow with the downhole fluid (i.e., injection fluid, hydrocarbon fluid, or a combination thereof) and be produced at a second well 504. The produced fluid may be monitored and analyzed for a presence of nonreactive tracer. Thus, the nonreactive tracer may be injected initially to determine and track inter-well connectivity between the first and second wells. In one or more embodiments, the nonreactive tracer may be injected at different depths of the first well to provide a more detailed map of inter-well connectivity between the first well and the second well. For example, in some embodiments, the nonreactive tracer may be injected at up to four different depths.

Method 500 then includes injecting a fluoro-based small molecule tracer into the first well 506. The fluoro-based small molecule tracer may be co-injected with the nonreactive tracer. The fluoro-based small molecule tracer may be injected neat, or as a solution in an injection fluid. The injection fluid may be any aqueous-based injection fluid such as water, brine, alkaline water, surfactant-based aqueous fluid, or polymer-based aqueous fluid.

In one or more embodiments, the fluoro-based small molecule tracer may be injected in an amount ranging from 5 to 1,000 kg. For example, methods may include injecting a fluoro-based small molecule tracer in an amount having a lower limit of any of 5, 10, 25, 50, 100, 150, 200, 250, 300, and 350 kg and an upper limit of any of 400, 450, 500, 550, 600, 650, 700, 750, 800, 850, 900, 950, and 1,000 kg where any lower limit may be paired with any mathematically compatible upper limit.

In embodiments in which a fluoro-based small molecule tracer is included in an injection fluid, the injection fluid may have a concentration of fluoro-based small molecule tracer ranging from 0.8 to 1.2 vol % (volume percent) based on the total volume of the injection fluid. For example, the injection fluid may include the nonreactive tracer in a concentration having a lower limit of any of 0.80, 0.85, 0.9, 0.95, and 1.0 vol % and an upper limit of any of 1.0, 1.05, 1.10, 1.15, and 1.2 vol %, where any lower limit may be paired with any mathematically compatible upper limit.

In embodiments in which a nonreactive tracer chemical is co-injected into the well with the fluoro-based small molecule tracer, the nonreactive tracer may be included in the injection fluid at a concentration of 0.25 to 1.20 vol %. For example, in some embodiments, the injection fluid includes the nonreactive tracer chemical in a concentration ranging from a lower limit of any of 0.25, 0.30, 0.35, 0.40, 0.50, and 0.60 vol % to an upper limit of any of 0.70, 0.80, 0.90, 1.00, 1.10, and 1.20 vol %, where any lower limit may be paired with any mathematically compatible upper limit. After injection into the first well, the fluoro-based small molecule and nonreactive tracers may flow with the downhole fluid (i.e., injection fluid, hydrocarbon fluid, or a combination thereof). In method 500, the downhole fluid and tracers flow into an inter-well region between the first well and the second well 508. At some point downhole, the fluoro-based small molecule tracer may come into contact with and react with water at an elevated downhole temperature to provide a fluorinated tracer 510, as described above. The fluoro-based small molecule tracer, the fluorinated tracer and the nonreactive tracer may be produced at a second well 512. The produced fluid may include one or more of gaseous hydrocarbons, liquid hydrocarbon, aqueous fluids, and other downhole chemicals. Fluid produced at the second well may be monitored for a presence of nonreactive tracer, fluorinated tracer, and fluoro-based small molecule tracer 514. Interactions of the fluoro-based small molecule with downhole fluids delay the production of the fluorinated tracer and any residual fluoro-based small molecule tracer at the second well, compared to the production time of the nonreactive tracer. Thus, through monitoring the produced fluid for each of the tracers, a difference in the production time between the nonreactive tracer and the fluoro-based small-molecule and fluorinated tracers at the second well may be used to determine residual oil saturation in the inter-well region 516. The difference in production time between the tracers may be represented by the peaks of tracer elution curves that are then used to estimate the residual oil saturation in the inter-well region. The residual oil saturation may be estimated based on the tracer elution curves according to any method known in the art.

Method 500 describes monitoring between two wells, however, as will be appreciated by this skilled in the art, any number of inter-connected wells may be analyzed using the methods described herein.

Embodiments of the present disclosure may provide at least one of the following advantages. Fluoro-based small molecule tracers described herein may be used to provide more accurate, less expensive hydrocarbon monitoring compared to current conventional methods. Similarly, fluoro-based small molecule tracers of one or more embodiments provide an environmentally friendly alternative to oil and gas chemical tracers commonly used today.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:
   injecting a fluoro-based molecule tracer and a nonreactive tracer into a first well in a subterranean formation;
   maintaining the fluoro-based molecule tracer and the nonreactive tracer in the subterranean formation for an amount of time, during which the fluoro-based molecule tracer comes into contact with water at a downhole temperature, wherein the water at the downhole temperature hydrolyzes bonds of the fluoro-based molecule tracer to provide a fluorinated tracer and a non-fluorinated group, wherein the fluorinated tracer is different from the nonreactive tracer;
   producing a hydrocarbon fluid at a second well;
   analyzing the hydrocarbon fluid for a presence of the fluorinated tracer, the fluoro-based molecule tracer, and the nonreactive tracer; and
   determining a residual oil saturation of a location of the subterranean formation based on the presence of the fluorinated tracer, the fluoro-based molecule tracer, and the nonreactive tracer in the hydrocarbon fluid.

2. The method of claim 1, wherein the nonreactive tracer is a fluoro alcohol.

3. The method of claim 1, further comprising:
   after injecting the fluoro-based molecule tracer into the first well, injecting a volume of an aqueous phase to push the fluoro-based molecule tracer a certain depth into the subterranean formation.

4. The method of claim 3, wherein the volume of the aqueous phase is 4 to 6 times the volume of the fluoro-based molecule tracer.

5. The method of claim 1, wherein the determining the residual oil saturation of the subterranean formation is based on a ratio between the presence of the fluorinated tracer, the fluoro-based molecule tracer, and the nonreactive tracer.

6. The method of claim 1, wherein the maintaining the fluoro-based molecule tracer in the subterranean formation occurs for a duration of 1 to 10 days.

7. The method of claim 1, wherein the location of the subterranean formation is an inter-well region between the first well and the second well.

8. The method of claim 1, wherein the determining the residual oil saturation of the subterranean formation is based on a difference in production times of the nonreactive tracer and the fluoro-based molecule tracer and fluorinated tracer.

9. The method of claim 1, further comprising:
   prior to injecting the fluoro-based molecule tracer and the nonreactive tracer into the first well in the subterranean formation, injecting an initial nonreactive tracer into the first well;
   after flowing through an inter-well region between the first well and the second well, producing the initial nonreactive tracer at the second well; and
   analyzing an inter-well connectivity between the first well and the second well based on the amount of the initial nonreactive tracer produced.

10. The method of claim 1, wherein the fluorinated tracer is a low boiling fluoro alcohol having a boiling point of 90° C. or less selected from the group consisting of trifluoromethanol, trifluoroethanol, hexafluoro-2-propanol, nanofluoro-tert-butyl alcohol, 1,1,1,3,3,3-hexafluoro-2-methyl-2-propanol, 1,1,1-trifluoro-2-propanol, and combinations thereof.

11. The method of claim 1, wherein the fluorinated tracer is a high boiling fluoro alcohol having a boiling point above 90° C. selected from the group consisting of 2,2-difluoroethanol, 2-fluoroethanol, 2,2,3,3-tetrafluoro-1-propanol, pentafluorophenol, fluoroalcohols having an alkyl chain length ranging from C4-C12, pentafluorophenol, 5-fluoro-1H-benzo[d][1,2,3]triazole-6-carboxylic acid, 4-fluoro-phenylcarbamoyl)-3H-imidazole-4-carboxylic acid, 5-fluoro-1H-benzo[d]imidazole-2-carboxylic acid, 2,2,3,3-tetrafluoro-1,4-butanediol, 2,2,3,3,4,4,5,5-octafluoro-1,6-hexanediol, and combinations thereof.

\* \* \* \* \*